(12) United States Patent
Zeng et al.

(10) Patent No.: US 12,405,517 B2
(45) Date of Patent: Sep. 2, 2025

(54) INTEGRATED ELECTRIC CONTROL TRIPOD

(71) Applicant: TILTA INC., Burbank, CA (US)

(72) Inventors: Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 266 days.

(21) Appl. No.: 18/142,221

(22) Filed: May 2, 2023

(65) Prior Publication Data

US 2024/0369915 A1 Nov. 7, 2024

(51) Int. Cl.
*G03B 17/56* (2021.01)
*F16M 11/04* (2006.01)
*F16M 11/12* (2006.01)
*F16M 11/24* (2006.01)

(52) U.S. Cl.
CPC ......... *G03B 17/561* (2013.01); *F16M 11/041* (2013.01); *F16M 11/126* (2013.01); *F16M 11/242* (2013.01)

(58) Field of Classification Search
CPC .... G03B 17/56; G03B 17/561; G03B 17/563; F16M 11/02; F16M 11/04; F16M 11/041; F16M 11/043; F16M 11/045; F16M 11/048; F16M 11/06; F16M 11/08; F16M 11/10; F16M 11/12; F16M 11/121; F16M 11/123; F16M 11/126; F16M 11/14; F16M 11/2007; F16M 11/2014; F16M 11/2021; F16M 11/2035; F16M 11/2042; F16M 11/205; F16M 11/2064; F16M 11/2078; F16M 11/242
See application file for complete search history.

(56) References Cited

U.S. PATENT DOCUMENTS

2024/0035615 A1\* 2/2024 Zeng ..................... F16M 13/04

\* cited by examiner

*Primary Examiner* — Stephanie E Bloss
*Assistant Examiner* — Fang-Chi Chang
(74) *Attorney, Agent, or Firm* — LOZA & LOZA, LLP; Derek Yeung

(57) ABSTRACT

Aspects of the present disclosure are directed to an integrated electric control tripod base that can accommodate different types of dovetail slide plates (e.g., Arca standard dovetail slide plate, Manfrotto standard dovetail slide plate, and Tilta standard dovetail slide plate. The integrated electric control tripod base can be remotely controlled to provide pan-tile control.

11 Claims, 6 Drawing Sheets

INTEGRATED ELECTRIC CONTROL TRIPOD

The present disclosure relates to the technical field of cameras, in particular to an integrated electric control tripod, and the mechanism and devices for using the integrated electric control tripod.

INTRODUCTION

At present, in the field of photography, the commonly used photographic tripods are mostly manually controlled, which requires the operator to install attachments of the tripod during use. Additionally, since most tripods on the market can accommodate one type of camera mount (e.g., bayonet mount or quick-release mount), in certain scenarios, dovetail plates cannot be quickly switched, multiple dovetail plates cannot share one pan-tilt device, and photographers often cannot quickly set up their equipment.

Therefore, the present disclosure aims to provide a tripod that can accommodate various dovetails or mounts, and at the same time, the tripod can be switched to an electrically controlled tripod for remote control through a handle, thus greatly improving the convenience and experience of photographers when using the tripod.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

In view of the shortcomings mentioned above, the present disclosure provides an integrated base, which solves the mounting limitations of the Arca standard dovetail slide plate, the Manfrotto standard dovetail slide plate, and the Tilta standard (custom) dovetail slide plate, solves the issues that the tripod cannot be remotely controlled, improves the adaptability of a tripod to various scenarios and enlarges the application scope of the product.

In order to achieve the above objectives, the present disclosure provides the following exemplary schemes.

An integrated electric control tripod includes an adjustable integrated base, a pan-tilt electric control assembly, a pan-tilt assembly, and a tripod. The adjustable integrated base is provided with a chute for installing an Arca standard dovetail plate and a chute for installing a Manfrotto standard dovetail plate, and the two dovetail plates can be adjusted back and forth to level the pan-tilt assembly;

In some aspects, the pan-tilt electric control assembly is provided with a driving motor to adjust a pitch axis of the pan-tilt assembly and a horizontal rotation axis of the pan-tilt. The pan-tilt assembly is provided with multi-stage pitch axis rebound adjustment and multi-stage pitch axis damping adjustment. Dynamic balance of loads with different weights can be realized through the rebound adjustment and damping adjustment of the pan-tilt assembly.

In some aspects, a camera can be mounted on the pan-tilt assembly, and the pan-tilt electric control assembly can drive the pan-tilt assembly to track an object using the camera.

In some aspects, the adjustable integrated base is provided with a bottom plate, an upper shell of the integrated base, a lower shell of the integrated base, a locking assembly, and a limiting assembly.

In some aspects, the pan-tilt electric control assembly is provided with a pitch-axis motor configured to control the pan-tilt assembly to rotate by any angle about the pitch axis; and a horizontal-axis motor configured to control the pan-tilt assembly to rotate by any angle about the horizontal rotation axis.

In some aspects, the pan-tilt assembly is provided with a rebound adjusting hand knob, wherein the rebound of an internal spring can be controlled in stages through rotation of the hand knob to realize different levels of rebound of the pan-tilt assembly. Further, the pan-tilt assembly is provided with a damping adjusting knob at a vertical position of the pan-tilt assembly. An internal damping disk can be adjusted through rotation of the damping adjusting knob to control multi-stage damping adjustment of the pitch axis of the pan-tilt assembly. Through adjusting the two knobs (rebound adjusting hand knob and damping adjusting knob), the dynamic balance of the pan-tilt assembly can be realized when cameras with different weights are installed.

In some aspects, the pan-tilt electric control assembly is detachably installed, and by being installed on the side of the pan-tilt assembly, an electric control tripod or a manual tripod can be adopted easily.

In some aspects, one or more buttons are arranged on the pan-tilt electric control assembly. The pitch axis and the horizontal rotation axis of the pan-tilt assembly can be controlled by the buttons, a wireless (e.g., Bluetooth, WiFi, etc.) module is arranged in the pan-tilt electric control assembly, and a handle can be connected (e.g., operatively or communicatively connected) through the wireless module, and operation of the pan-tilt electric control assembly can be controlled remotely through the handle.

In some aspects, gear teeth (or gears) are arranged on a side and a lower part of the pan-tilt assembly, the gear teeth are configured to provide mesh positions for gears on the pan-tilt electric control assembly, so as to realize a function of electronically controlling the pan-tilt assembly to pitch and rotate horizontally.

In some aspects, the upper shell of the integrated base includes an Arca standard dovetail area, a Manfrotto standard dovetail area, a multidirectional locking assembly mounting area, and a limit assembly mounting area. The Arca standard dovetail area is arranged in a horizontal area of a composite quick-mounting base, and is in the form of a dovetail chute for accommodating an Arca standard dovetail slide plate. The Manfrotto standard dovetail area is arranged in a longitudinal area of the composite quick-mounting base. One side of the Manfrotto standard dovetail chute is a standard Manfrotto standard dovetail chute, and the other side is a vertical surface. Both sides form a unilateral (single-sided) Manfrotto dovetail chute. The Manfrotto dovetail area can accommodate a Manfrotto standard dovetail slide plate. The multidirectional locking assembly is arranged at an intersection of a central axis of the Arca standard dovetail area and the vertical surface of the Manfrotto standard dovetail area.

In some aspects, the lower shell of the integrated base includes a custom (e.g., Tilta standard) sliding strip.

In some aspects, the bottom plate includes a custom (e.g., Tilta standard) chute.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

Figure 1:
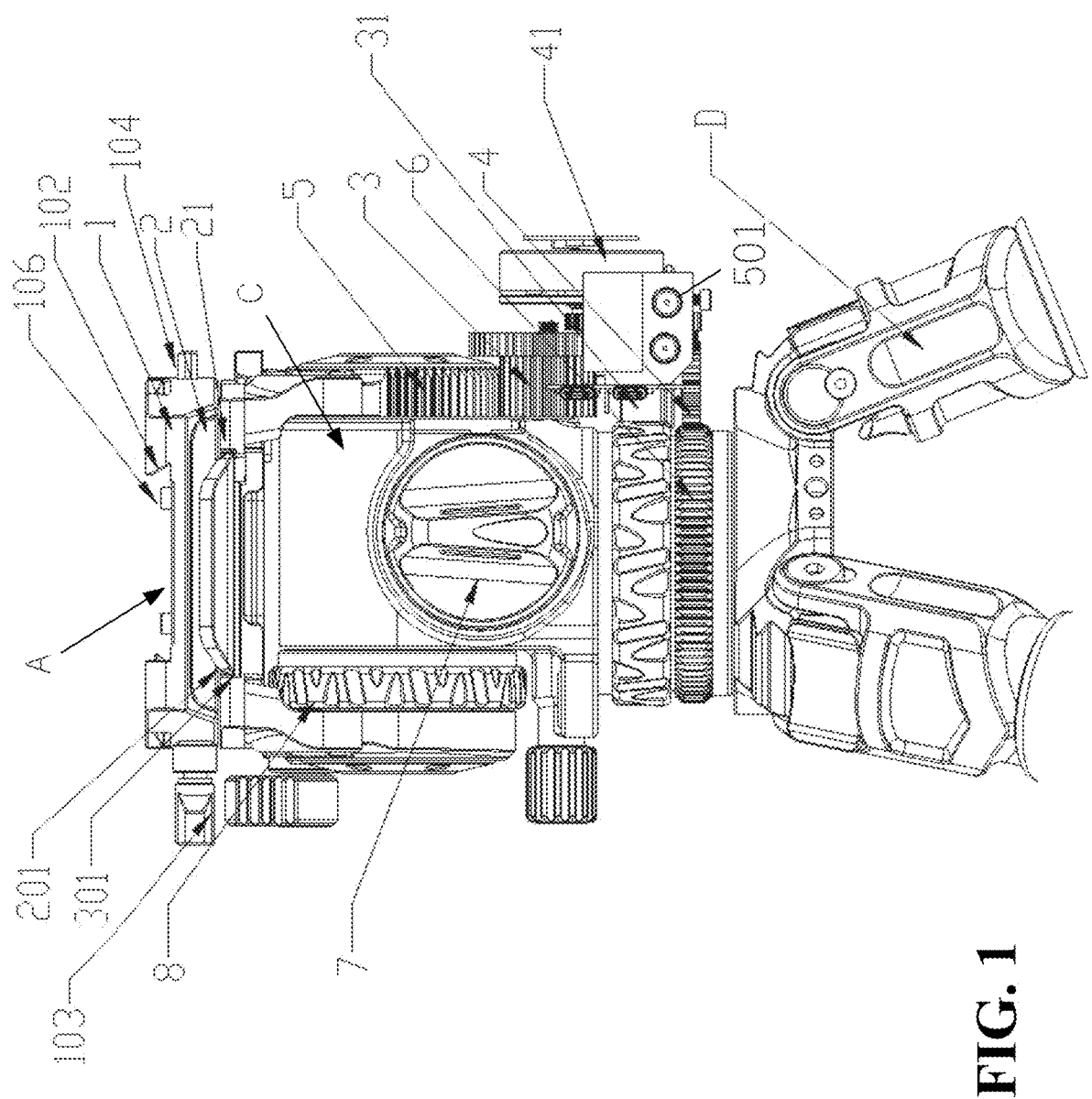
FIG. 1 is a first schematic assembly diagram of an integrated electric control tripod according to some aspects of the present disclosure.
Figure 2:
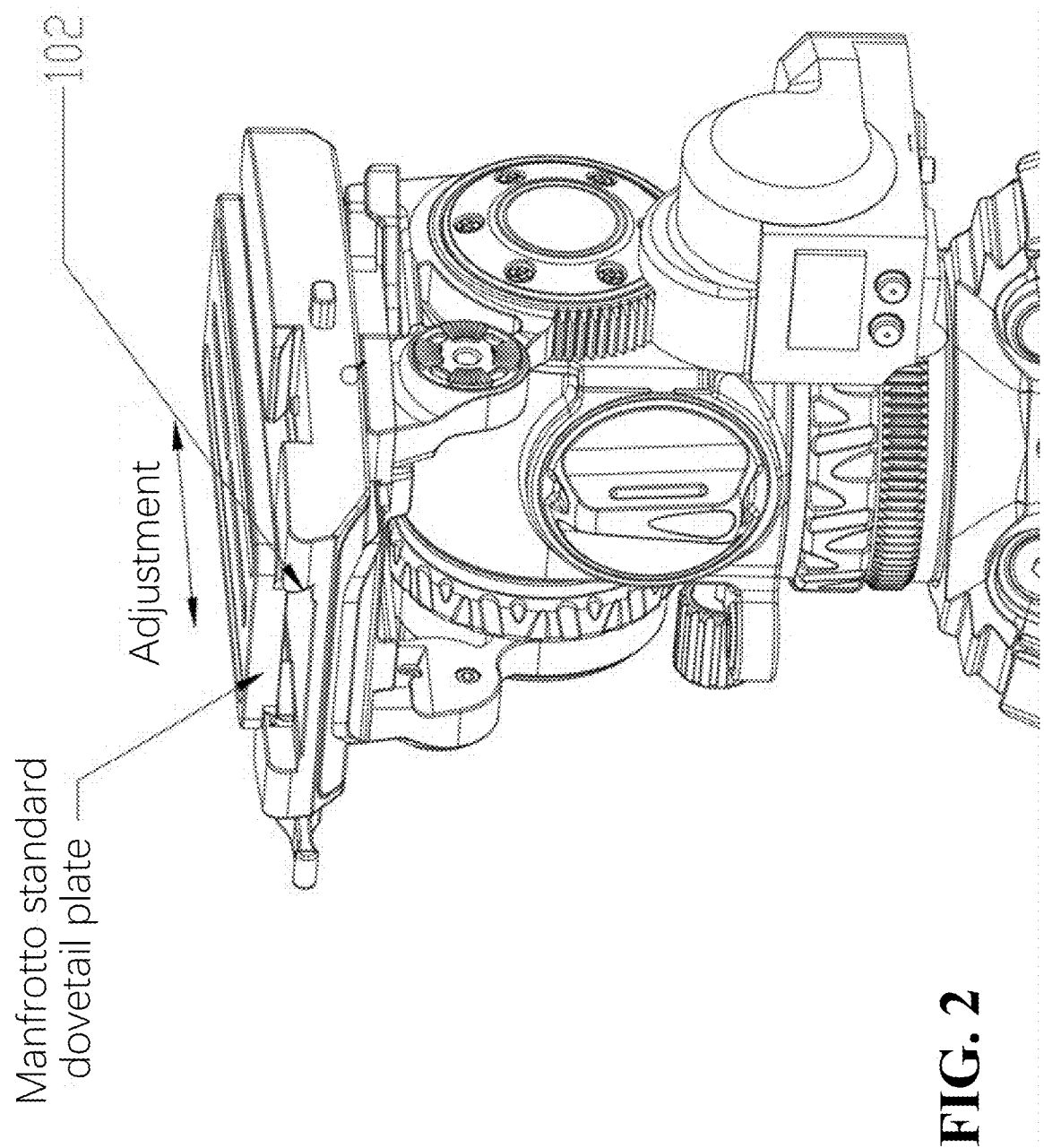
FIG. 2 is a second schematic diagram of the integrated electric control tripod according to some aspects of the present disclosure.
Figure 3:
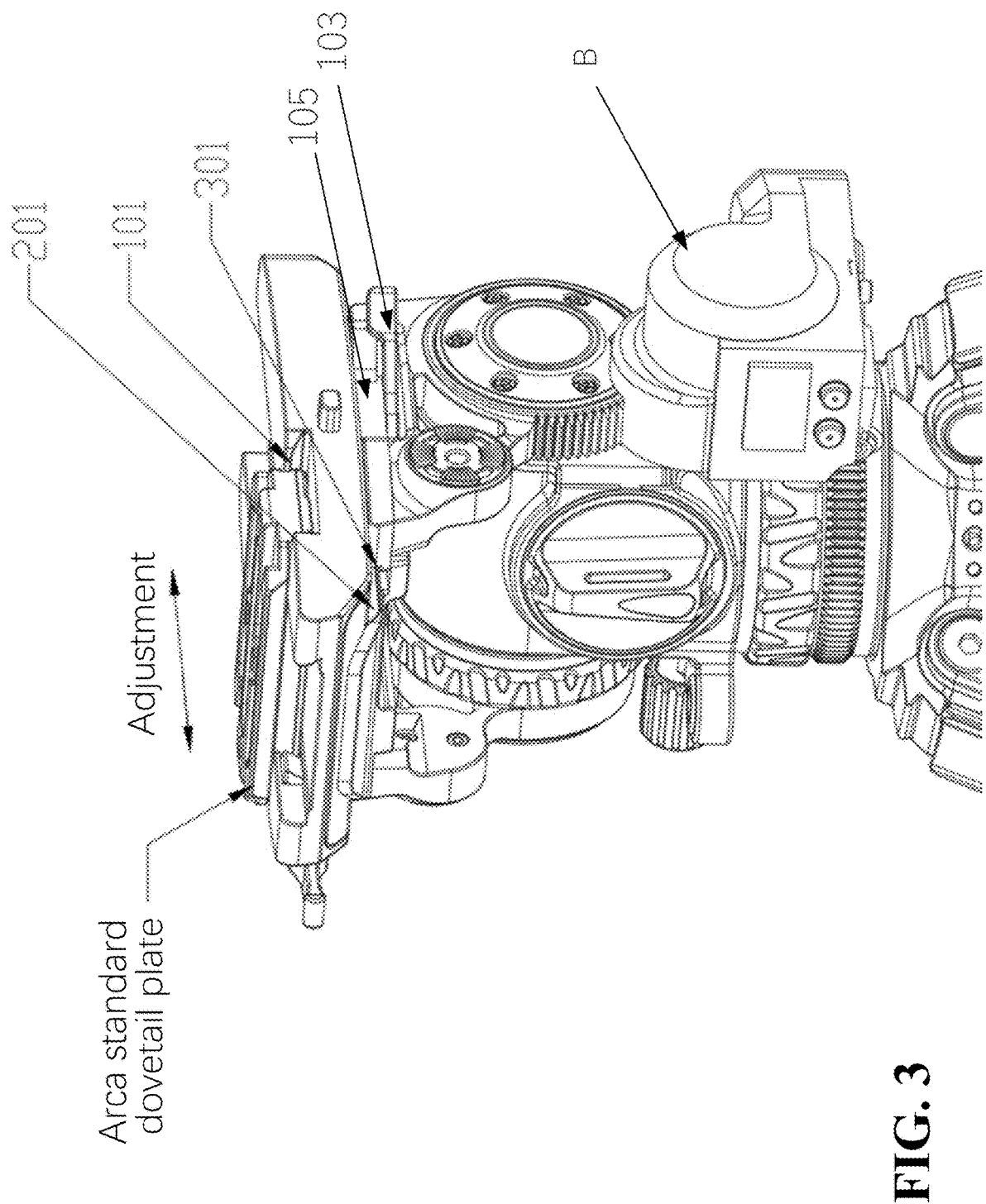
FIG. 3 is a third schematic diagram of the integrated electric control tripod according to some aspects of the present disclosure.
Figure 4:
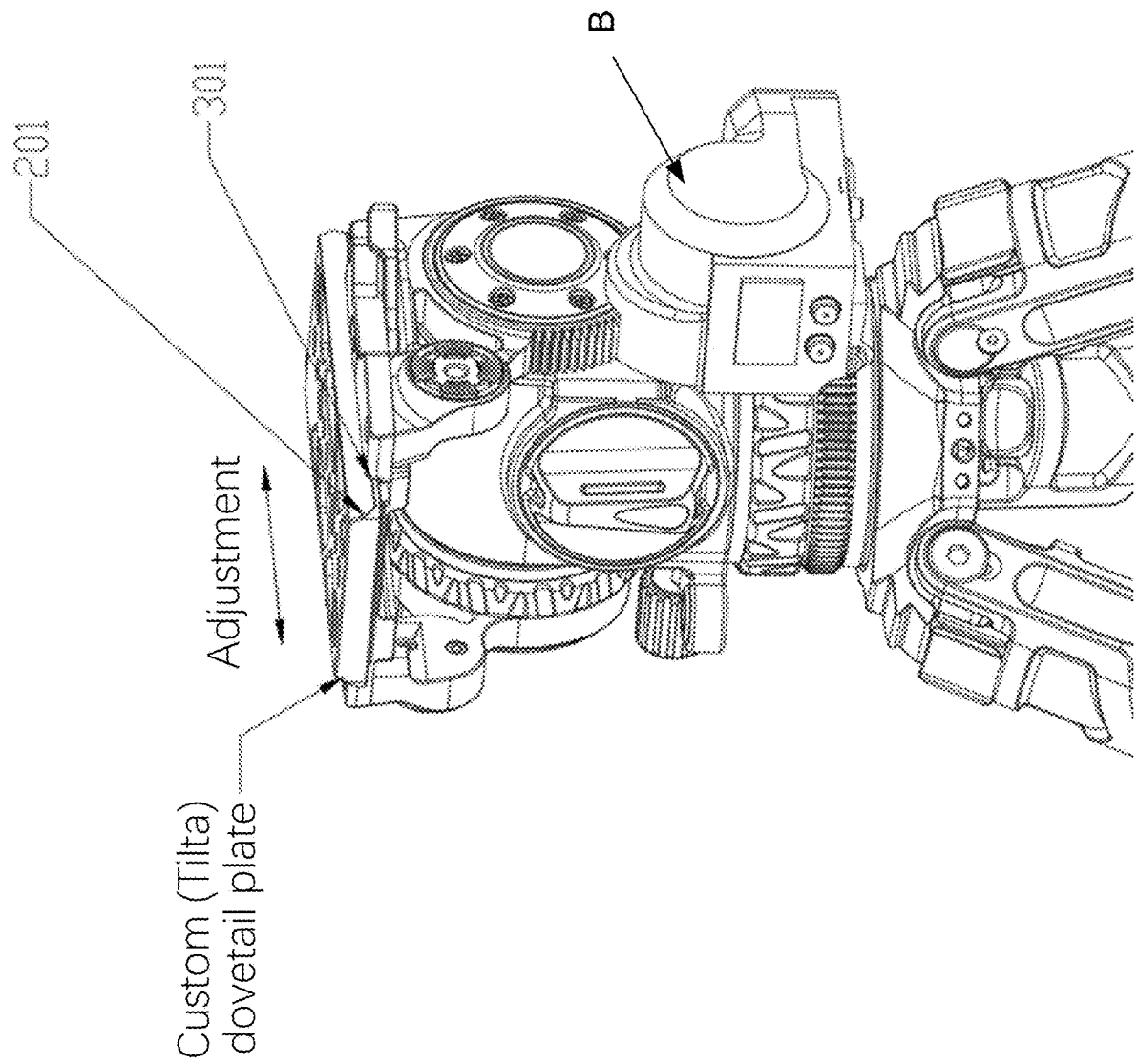
FIG. 4 is a fourth schematic diagram of the integrated electric control tripod according to some aspects of the present disclosure.
Figure 5:
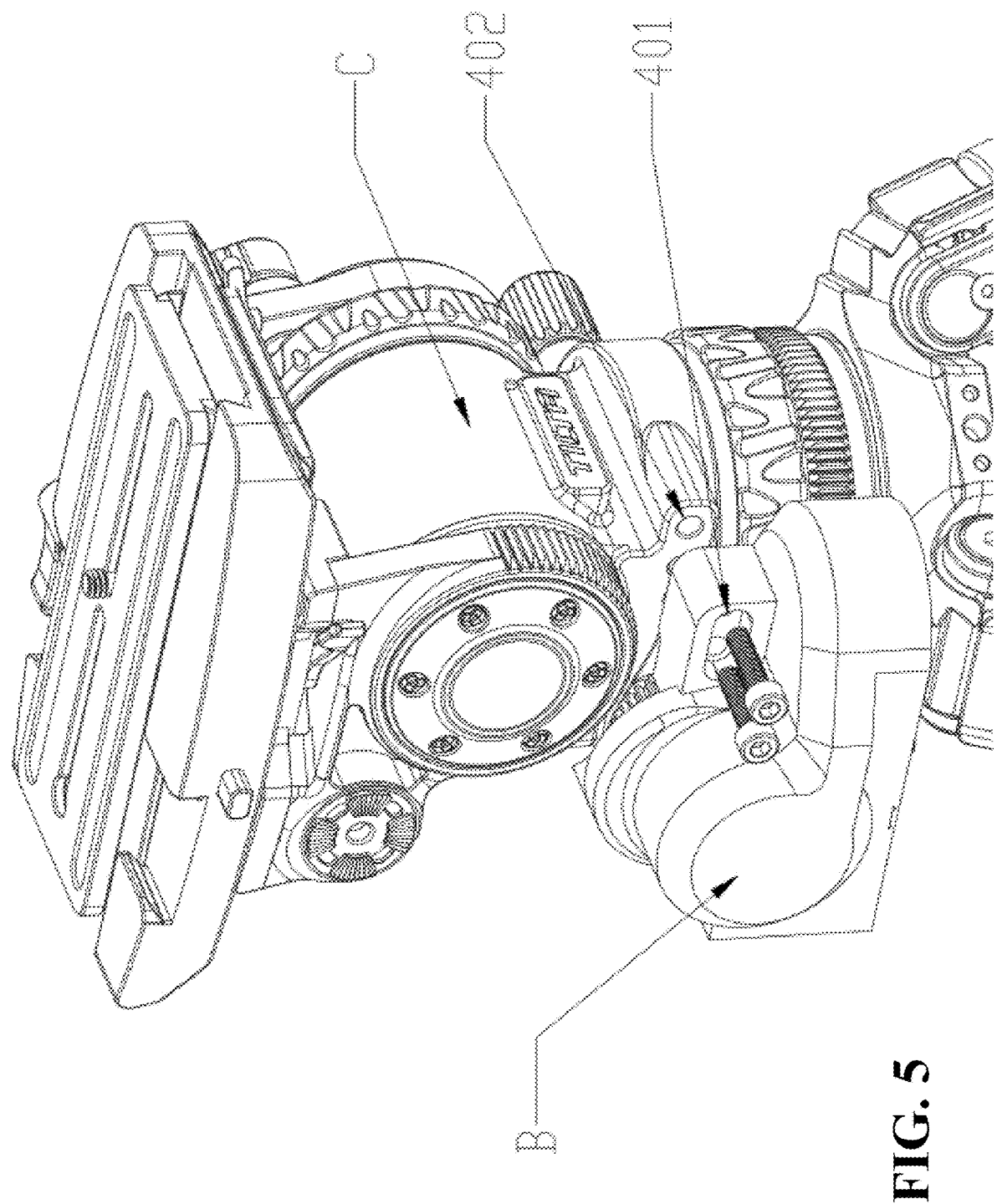
FIG. 5 is a fifth schematic diagram of the integrated electric control tripod according to some aspects of the present disclosure.
Figure 6:
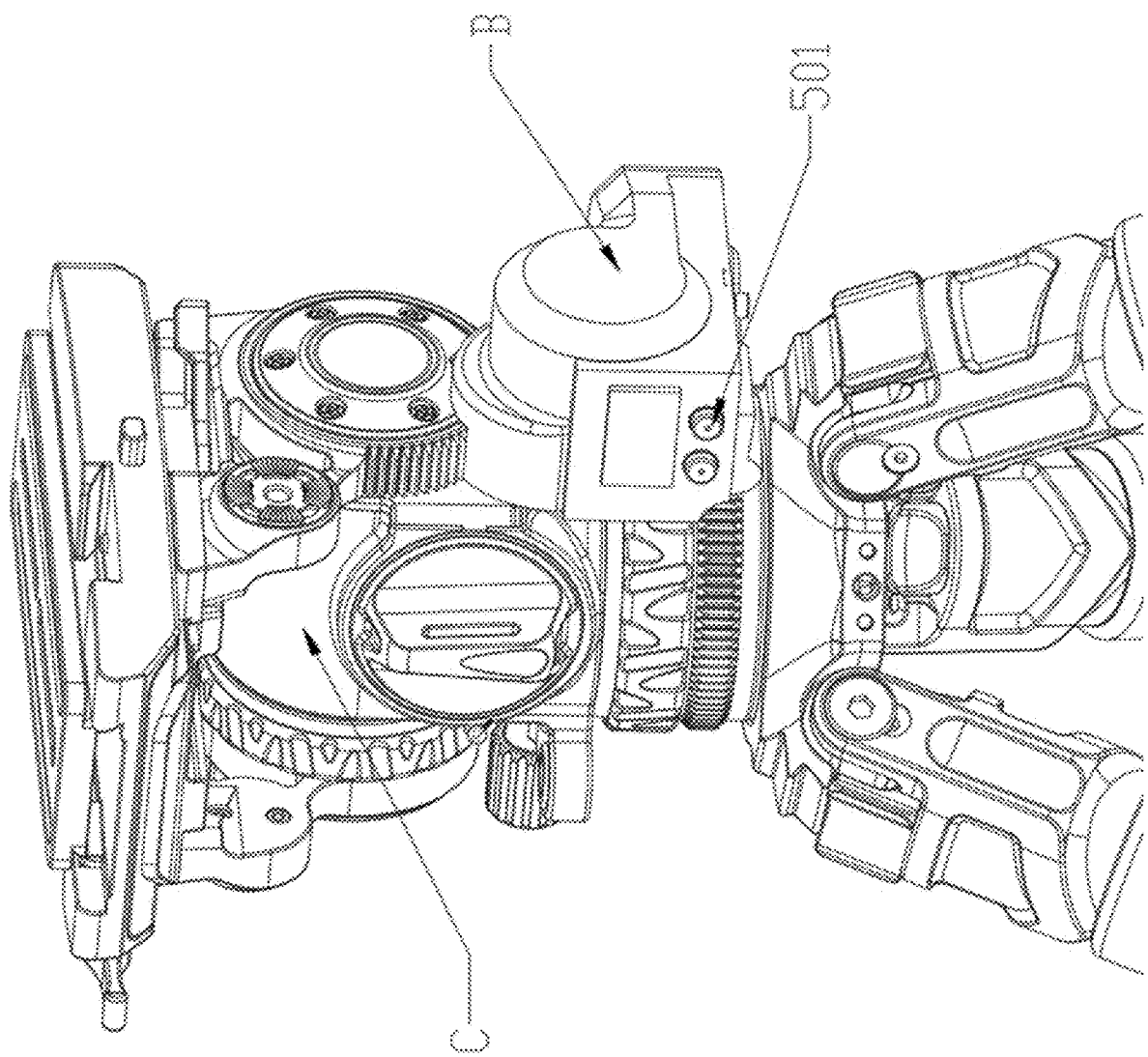
FIG. 6 is an sixth schematic diagram of the integrated electric control tripod according to some aspects of the present disclosure.

The present disclosure will be described in conjunction with the accompanying drawings. Now referring to FIGS. 1-5, the present disclosure provides an integrated electric control tripod (IECT), which includes an adjustable integrated base A, a pan-tilt electric control assembly B, a pan-tilt assembly C, and a tripod D.

The adjustable integrated base A includes an upper shell 1 of the integrated base, a lower shell 2 of the integrated base, and a bottom plate 21. The adjustable integrated base A further includes: a locking assembly 103 and a limiting assembly 104.

The pan-tilt electric control assembly B includes a pitch-axis motor output gear 3 and a horizontal rotation axis output gear 4.

The pan-tilt assembly C includes a pitch axis gear 5, a horizontal rotation axis gear 6, a rebound (resilience) adjusting knob 7, and a damping adjusting knob 8.

Further, in some aspects, the upper shell 1 of the integrated base includes an Arca standard dovetail area 101 (FIG. 3), and a Manfrotto unilateral (single-sided) dovetail area 102. The Arca standard dovetail area 101 provides the mounting area of an Arca standard dovetail sliding strip, and the Manfrotto unilateral dovetail area 102 provides the mounting area of the Manfrotto standard dovetail sliding strip.

The Arca standard (also known as Arca-Swiss standard) dovetail is a type of quick-release plate system commonly used in photography and videography to mount cameras onto tripods or other support devices. It typically consists of a metal plate with a dovetail-shaped groove that matches the clamp on the mounting area of a tripod. The Manfrotto dovetail is a type of quick-release plate system used in photography and videography to mount cameras onto tripods or other support devices. A Manfrotto mount can consist of a rectangular or square-shaped plate that attaches to the camera's tripod socket and has a protruding lip on one or more sides. The lip is inserted into a corresponding clamp on the tripod or head, which secures the camera in place.

Further, in some aspects of the present disclosure, the lower shell 2 of the integrated base includes a custom (e.g., Tilta standard) dovetail sliding strip 201. The custom dovetail sliding strip 201 can be installed in a corresponding custom (e.g., Tilta standard) dovetail chute.

Further, in some aspects of the present disclosure, the bottom plate 21 includes a custom (e.g., Tilta standard) dovetail area 301. The custom dovetail area 301 provides the installation area of the custom (e.g., Tilta standard) dovetail sliding strip 201.

Further, in some aspects of the present disclosure, when installing a standard Manfrotto dovetail plate, the standard Manfrotto dovetail plate can be installed in the Manfrotto standard dovetail area 102 in the upper shell 1 of the integrated base, and the leveling work is carried out through the Manfrotto chute when installing different cameras.

Further, in some aspects of the present disclosure, when installing an Arca standard dovetail plate, the Arca standard dovetail plate can be installed in the Arca standard dovetail area 101 on the upper shell 1 of the integrated base, and the leveling work can be carried out through the custom (e.g., Tilta standard) dovetail sliding strip 201 in the lower shell 2 of the integrated base and the custom (e.g., Tilta standard) dovetail area 301 in the bottom plate 21.

Further, in some aspects of the present disclosure, when it is needed to install the custom (e.g., Tilta standard) sliding strip 201, the upper shell 1 and the lower shell 2 of the integrated base can be removed from the bottom plate 21, and the custom sliding strip 201 can be installed in the custom (e.g., Tilta standard) dovetail area 301 on the bottom plate 21, and leveling work can be carried out through the custom sliding strip 201.

Further, in some aspects of the present disclosure, when cameras with different weights are installed, by rotating the rebound adjusting knob 7 on the pan-tilt assembly B, different rebound forces of the pan-tilt pitch axis can be adjusted. Further, the damping adjusting knob 8 on the pan-tilt B can be rotated to adjust the damping of the pan-tilt axis. After adjusting the rebound and damping, the dynamic balance of cameras with different weights can be realized, so that the difficulty of using the pan-tilt device when users install cameras can be reduced. Further, the output torque of the pan-tilt electric control assembly B can be reduced, and the volume/size of the pan-tilt electric control assembly can be greatly reduced.

Further, in some aspects of the present disclosure, for electrically controlling the camera pan-tilt device, the pan-tilt electric control assembly B can be connected and installed with the screw hole 401 (FIG. 5) on the pan-tilt electric control assembly B and the screw hole 402 (FIG. 5) on the pan-tilt assembly C through screws. The pitch-axis motor output gear 3 on the pan-tilt electric control assembly B meshes with the pitch axis gear 5 on the pan-tilt assembly C, and the horizontal rotation axis output gear 4 on the pan-tilt electric control assembly B meshes with the horizontal rotation axis gear 6 on the pan-tilt assembly B. The pitch-axis motor 31 drives the pitch-axis motor output gear 3, which in turn drives the pitch axis gear 5, which in turn drives the pan-tilt assembly C to realize the rotation around the pitch axis. The horizontal rotation axis motor 41 drives the horizontal rotation axis output gear 4, which in turn drives the horizontal rotation axis gear 6, which in turn drives the horizontal rotation of the pan-tilt assembly C.

Further, when remote control is used, the pan-tilt electric control assembly B can be connected through a remote handle, and the motor of the electric control pan-tilt assembly B can be controlled by manipulating the buttons on the remote handle, so as to control the pitch and horizontal rotation of the pan-tilt assembly C. For controlling the pan-tilt assembly C through the pan-tilt electric control assembly B at close range (e.g., without using a remote controller or handle), the pan-tilt assembly C can be controlled through the buttons 501 on the pan-tilt electric control assembly B.

In some aspects, the upper shell of the integrated base includes an Arca standard dovetail area 101, a Manfrotto standard dovetail area 102, a multidirectional locking assembly mounting area 105, and a limit assembly mounting area 106. The Arca standard dovetail area 101 is arranged in a horizontal area of a composite quick-mounting base, and is in the form of a dovetail chute for accommodating an Arca standard dovetail slide plate. The Manfrotto standard dovetail area 102 is arranged in a longitudinal area of the composite quick-mounting base. One side of the Manfrotto standard dovetail chute is a standard Manfrotto standard dovetail chute, and the other side is a vertical surface. Both sides form a unilateral (single-sided) Manfrotto dovetail chute. The Manfrotto dovetail area can accommodate a Manfrotto standard dovetail slide plate. The multidirectional locking assembly is arranged at an intersection of a central axis of the Arca standard dovetail area 101 and the vertical surface of the Manfrotto standard dovetail area 102.

The above are only the exemplary embodiments of the present disclosure, and are not intended to limit the present disclosure. Any modification, equivalent substitution and improvement made within the spirit and principle of the present disclosure should fall within the protection scope of the present disclosure.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, processes, operations, elements, and/or components, but do not preclude the presence or addition of one or more other features, integers, processes, operations, elements, components, and/or groups thereof.

It is to be appreciated that the present disclosure is not limited to the exemplary terms used above to describe aspects of the present disclosure. For example, bandwidth may also be referred to as throughput, data rate or another term.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An integrated electric control tripod, comprising:
   an adjustable integrated base;
   a pan-tilt electric control assembly;
   a pan-tilt assembly; and
   a tripod, wherein:
   the adjustable integrated base is provided with a first chute for installing an Arca standard dovetail plate and a second chute for installing a Manfrotto standard dovetail plate, and the Arca standard dovetail plate and the Manfrotto standard dovetail plate being adjustable back and forth in the first chute and second chute, respectively, to level the pan-tilt assembly;
   the pan-tilt electric control assembly is provided with a driving motor to adjust a pitch axis of the pan-tilt assembly and a horizontal rotation axis of the pan-tilt assembly; and
   the pan-tilt assembly is provided with multi-stage pitch axis rebound adjustment and multi-stage pitch axis damping adjustment, configured to dynamically balance loads with different weights through the multi-stage pitch axis rebound adjustment and the multi-stage pitch axis damping adjustment.

2. The integrated electric control tripod according to claim 1, further comprising a camera, wherein the pan-tilt electric control assembly is configured to drive the pan-tilt assembly to track an object using the camera.

3. The integrated electric control tripod according to claim 1, wherein the adjustable integrated base comprises:
   a bottom plate;
   an upper shell of the adjustable integrated base;
   a lower shell of the adjustable integrated base;
   a locking assembly; and
   a limiting assembly.

4. The integrated electric control tripod according to claim 3, wherein the upper shell of the adjustable integrated base comprises:
   an Arca standard dovetail area;
   a Manfrotto standard dovetail area;
   a multidirectional locking assembly mounting area; and
   a limiting assembly mounting area,
   wherein the Arca standard dovetail area is arranged in a horizontal area of a composite quick-mounting base, and is in the form of a dovetail chute for accommodating an Arca standard dovetail slide plate,
   wherein the Manfrotto standard dovetail area is arranged in a longitudinal area of the composite quick-mounting base, a first side of the Manfrotto standard dovetail chute provides a standard Manfrotto standard dovetail chute, and a second side of the Manfrotto standard dovetail chute provides a vertical surface, the first side and the second side forming a single-sided Manfrotto standard dovetail chute to accommodate a Manfrotto standard dovetail slide plate, and wherein the multidirectional locking assembly mounting area is arranged at an intersection of a central axis of the Arca standard dovetail area and the vertical surface of the Manfrotto standard dovetail chute.

5. The integrated electric control tripod according to claim 3, wherein the lower shell comprises a custom sliding strip.

6. The integrated electric control tripod according to claim 3, wherein the bottom plate comprises a custom chute different from an Arca standard dovetail chute and a Manfrotto standard dovetail chute.

7. The integrated electric control tripod according to claim 1, wherein the pan-tilt electric control assembly comprises:
- a pitch-axis motor configured to control the pan-tilt assembly to rotate about a pitch axis; and
- a horizontal-axis motor configured to control the pan-tilt assembly to rotate about a horizontal rotation axis.

8. The integrated electric control tripod according to claim 1, wherein the pan-tilt assembly comprises:
- a rebound adjusting knob configured to adjust the rebound of the pan-tilt assembly in multiple stages with different rebound; and
- a damping adjustment knob at a vertical position of the pan-tilt assembly, configured to provide multi-stage damping adjustment of the pitch axis of the pan-tilt assembly through a rotation of the damping adjustment knob.

9. The integrated electric control tripod according to claim 1, wherein the pan-tilt electric control assembly is detachably installed to a side of the pan-tilt assembly.

10. The integrated electric control tripod according to claim 1, wherein the pan-tilt electric control assembly comprises:
- one or more buttons configured to control the pitch axis and the horizontal rotation axis of the pan-tilt assembly;
- a wireless module configured to be operable with a handle; and
- wherein an operation of the pan-tilt electric control assembly is configured to be controlled remotely through the handle.

11. The integrated electric control tripod according to claim 1, wherein the pan-tilt assembly comprises:
- a first gear on a side and a second gear on a lower part of the pan-tilt assembly, the first gear and second gear being configured to mesh with respective gears on the pan-tilt electric control assembly, so as to realize a function of electronically controlling the pan-tilt assembly to pitch and rotate horizontally.

* * * * *